Sept. 13, 1966  J. C. CHATO  3,272,203
SURGICAL PROBE
Filed April 29, 1963  4 Sheets-Sheet 1

INVENTOR.
JOHN C. CHATO
BY
ATTORNEY

Sept. 13, 1966  J. C. CHATO  3,272,203
SURGICAL PROBE

Filed April 29, 1963  4 Sheets-Sheet 2

INVENTOR.
JOHN C. CHATO

BY

ATTORNEY

Sept. 13, 1966 J. C. CHATO 3,272,203
SURGICAL PROBE
Filed April 29, 1963 4 Sheets-Sheet 3

INVENTOR.
JOHN C. CHATO
BY
ATTORNEY

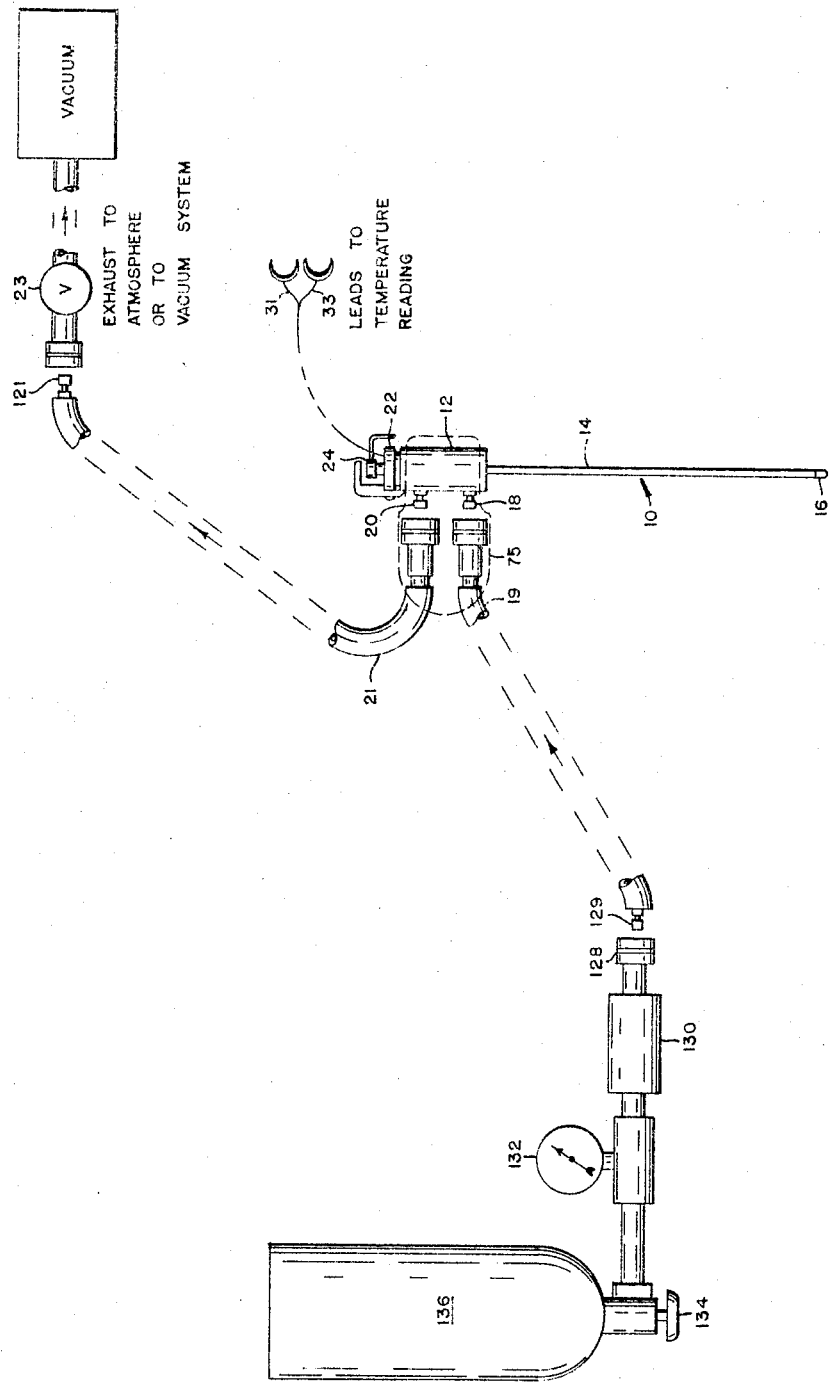

United States Patent Office 3,272,203
Patented Sept. 13, 1966

3,272,203
SURGICAL PROBE
John C. Chato, Arlington, Mass.
(714 W. Vermont Ave., Urbana, Ill. 61801)
Filed Apr. 29, 1963, Ser. No. 276,235
11 Claims. (Cl. 128—303.1)

The present invention relates generally to surgical instruments and, more particularly, to a surgical probe having a cooled tip for use in cryosurgery.

Advanced medical knowledge and technology have created a need, particularly in the fields of exploratory surgery of the central nervous system, of the brain, of the prostate gland, and of the eyes, for cooling selected small, internal areas of the human body. Cryosurgery is increasingly resorted to by neurosurgeons in operative efforts aimed at relieving patients suffering from neurological disorders such as Parkinson's syndrome where surgical destruction of various portions of the central nervous system has had salutary effects. Surgical excision is also one preferred treatment of tumors of the cerebral hemispheres such as, for example, meningiomas. Tremors of hyperthroidism have likewise been successfully alleviated by exploratory surgery. Cryocautery is a promising new surgical treatment of retinal detachment of the human eye, while cryosurgery is a refined operative technique for the removal of the lens of the human eye affected by degenerative cataract. The central nervous system, furthermore, can, with good results, be explored with localized reversible lesions effected by cooling the tissue.

In the case of some of such operative invasions of the central nervous system and of the brain, the surgeon or psychologist may merely wish to explore the effects on the patient's or the experimental animal's reaction to localized cooling of certain selected small areas of the brain. In other instances, as in the case of Parkinson's syndrome, the surgeon wishes to destroy brain tissue in a predetermined area of the central nervous system. The surgeon may accomplish this destruction of tissue by excision, by heating, such as by means of radio-frequency waves, or by localized freezing maintained at a selected temperature level for a given period of time. In such case of localized freezing or cooling, the surgeon or psychologist is particularly anxious to have the selected temperature level apply only in the small designated area in such a manner that tissue that had to be traversed to reach that area is not also subjected to cooling. The surgeon is, furthermore, most desirous to control the temperature level at the small internal designated area: to maintain it at a constant level for a period and to adjust it by quickly lowering or increasing the temperature at that area according to the dictates of the patient's condition or the requirements of the operative technique.

The present invention contemplates to aid the surgeon or psychologist in his performance of such and related operations by the provision of a new and improved surgical probe provided with a cooled tip. It is an object of the present invention, therefore, to provide an improved surgical probe having a cooled tip designed principally for use in cryosurgery. It is another object of the present invention to provide an improved surgical probe by the use of which a surgeon may apply localized cooling to a small, designated internal area of the human body in a manner that portions of the body traversed to reach that area are not also subjected to cooling. It is still another object of the present invention to provide an improved surgical probe in the operative use of which a surgeon may precisely select, maintain, adjust or otherwise control the temperature level he wishes to have applied thereby to a small, designated internal area of the human body. It is a further object of the present invention to provide an improved surgical probe having a tip which can initially be cooled and can thereafter be used to heat the surrounding tissue by the application thereto of radio frequency. It is a still further object of the present invention to provide an improved surgical probe having a hollow disc-like member whose parallel sides may be maintained at a temperature differential. It is still another object of the present invention to provide an improved surgical probe having a cooled tip which is also provided with a lateral prong designed for use in eye surgery. It is a still further object of the present invention to provide an improved surgical probe having a cooled tip which may be enclosed by a slip-on removable lateral prong designed for use in eye surgery.

Other and further objects of the invention will in part be obvious and will in part appear hereinafter.

The invention accordingly comprises the novel surgical probe for use in cryo and related surgery and in psychological experiments, and possessing the constructions which are exemplified in the following detailed disclosure, and the scope of which will be indicated in the appended claims.

For a fuller understanding of the nature and objects of the invention, reference should be had to the following detailed description, taken in connection with the accompanying drawings wherein:

FIG. 10 is a schematic representation of one preferred setup for the surgical probe of the invention.

Figure 1:
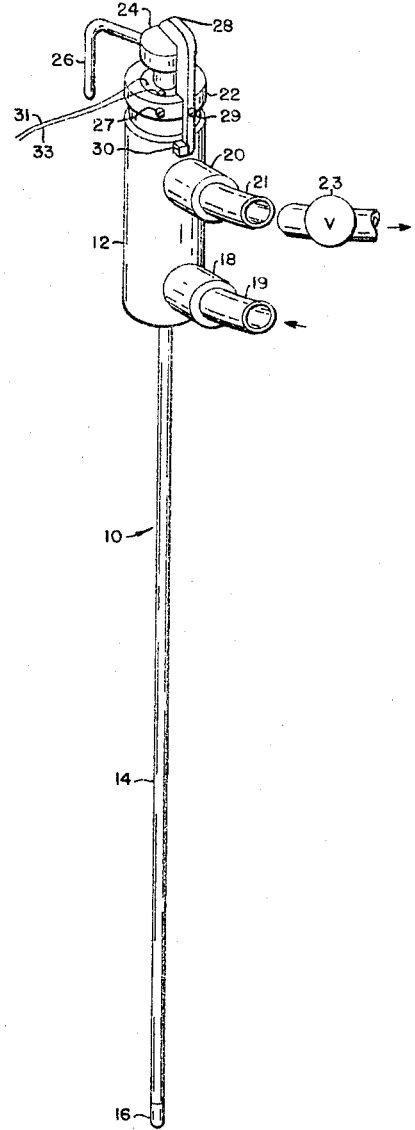
FIG. 1 is a perspective view of one preferred surgical probe constructed in accordance with an embodying the present invention.
Figure 2:
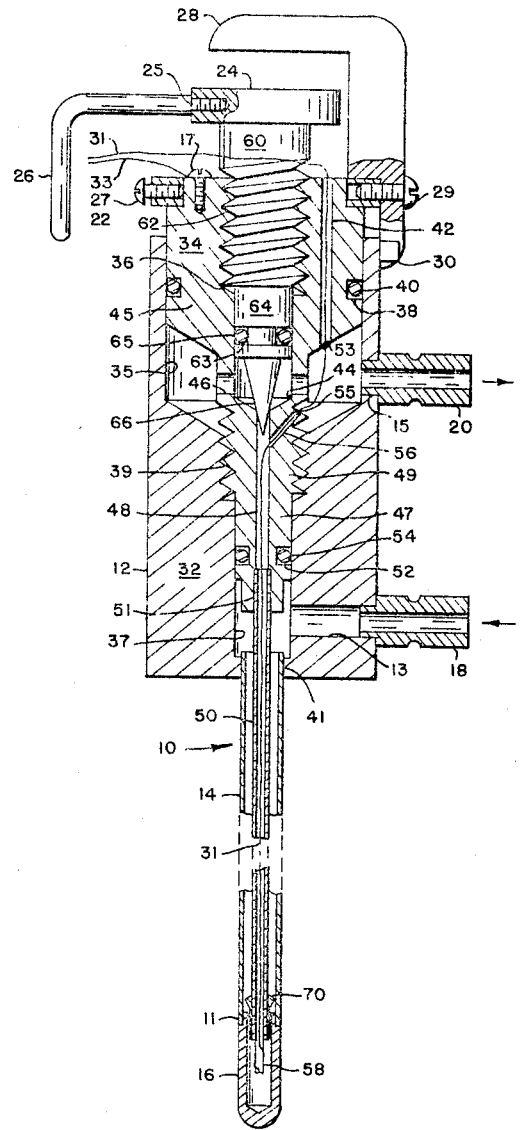
FIG. 2 is, on a enlarged scale, a longitudinal section of the surgical probe shown in FIG. 1.

Referring to the drawings in which like reference numbers refer to like parts throughout and in particular to FIGS. 1 and 2, the reference character 10 denotes one preferred embodiment of a surgical probe constructed in accordance with the invention. The surgical probe 10 is preferably made of a metallic material that suits itself to quick and easy sterilization, such as stainless steel. The surgical probe 10 comprises a cylindrical housing 12 consisting of an outer member 32 and of an inner member 34 operatively mounted for motion in translation within said outer member 32 and in concentric relation thereto along the longitudinal axis of the cylindrical housing 12. The outer member 32 is provided along its longitudinal axis with a concentric internal passage consisting of three distinct but contiguous sections: an upper concentric cavity 35 designed telescopically to accommodate the smooth upper portion 45 of the inner member 34, a lower concentric cavity 37 designed to receive the smooth lower portion 47 of the inner member 34, and an internally threaded portion 39 connecting the upper concentric cavity 35 with the lower concentric cavity 37 and designed to receive the externally threaded portion 49 of the inner member 34. As may be noted, rotation of the inner member 34 about the longitudinal axis of the housing 12 will effect translatory motion of the inner member 34 with reference to the outer member 32. The outer member 32 is, furthermore, being provided with a pair of spaced radial bores 13 and 15 lying in a plane normal to the longitudinal axis of the housing 12, with bore 13 connecting with the lower concentric cavity 37 and bore 15 connecting with the upper concentric cavity 35. The pair of spaced radial bores 13 and 15 are designed to receive suitable connector fittings 18 and 20, respectively, by means of which appropriate flexible pipes or rubber hoses 19 and 21, respectively, may be detachably and operatively connected to the cylindrical housing 12.

The lower concentric cavity 37 constricts somewhat, at a point just below where it connects with radial bore 13, into terminal concentric hole 41. One end of an elongated tube 14 is securely mounted in this terminal concentric hole 41 of outer member 32 of the cylindrical housing 12, coaxial with the longitudinal axis of housing 12. The other end of the tube 14 is capped by a tip 16. As may be best observed in FIG. 3, the tip 16 is formed with a chamber 78 and is welded or soldered, as at 11, to the end of the tube 14 in such a manner as to form an internal annular abutment 74. The significance of this internal annular abutment 74 will be adverted to below.

The inner member 34 is likewise provided, along its longitudinal axis, with a concentric internal passage consisting of three distinct, but contiguous sections: an internally threaded portion 36, a smooth-walled upper chamber 44, and a smooth-walled lower concentric bore 48. The smooth-walled upper chamber 44 is, furthermore, provided with a number of radial passageways 46. The inner member 34 is also formed with two annular grooves 38 and 52 with each of the grooves designed to accommodate O-rings 40 and 54, respectively. These O-rings serve to ensure fluid-tight mounting of the inner member 34 within the outer member 32 of the housing 12. In addition, the inner member 34 is provided with an eccentric bore 42 running parallel with its longitudinal axis and also with a slanted bore 56. One end of an elongated tube 50 is securely mounted in the smooth-walled lower concentric bore 48 of the inner member 34, while the other, free end of the tube 50 extends into, and in concentrically spaced relation to the tube 14. A sleeve 70, provided with an annular conical surface 72, is welded or soldered, as at 71, to the outer, free end of the tube 50, as may be best observed in FIG. 3. The annular conical surface 72 of the sleeve 70 forms, in conjunction with the internal annular abutment 74 of the tip 16, an annular orifice 76. The function and purpose of the annular conical surface 72 is to close off or to open, to the extent desired, the annular orifice 76. When the annular orifice 76 is closed, fluid, such as liquid refrigerant, admitted between the outer tube 14 and the inner tube 50, cannot pass into the refrigerating chamber 78 of the tip 16. On the other hand, when the annular orifice 76 is open, fluid is permitted to pass through the orifice 76 and into the refrigerating chamber 78. This annular orifice 76 may be closed off by rotating the inner member 34 clockwise within the outer member 32 until the extent of the translatory motion transmitted thereby to the free end of the inner tube 50 is such as to bring the annular conical surface 72 of the sleeve 70 in contact with the internal annular abutment 74. In like manner, the preferred opening for the annular orifice 76 may be conveniently selected by rotating the inner member 34 counter-clockwise within the outer member 32 until the extent of the translatory motion transmitted thereby to the free end of the inner tube 50 is such as to space the annular conical surface 72 of the sleeve 70 at the desired distance away from the internal annular abutment 74. To facilitate the adjustment of the annular orifice 76, a convenient adjusting ring 22 is provided at the upper end of the internal member 34. The adjusting ring 22 is suitably secured to the internal member 34 by a set screw 27.

Figure 3:
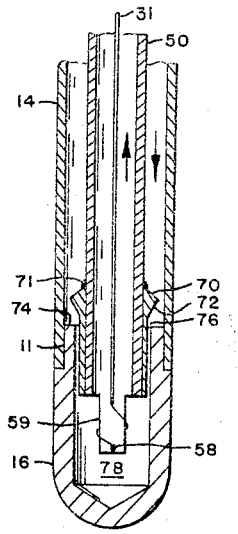
FIG. 3 is, on a much enlarged scale, a fragmentary section of the surgical probe shown in FIGS. 1 and 2, showing its cooled tip.

As may be further observed in FIG. 3, the free end of the inner tube 50 terminates in a tongue 59 designed to extend into the chamber 78 of the tip 16. This tongue 59 has been provided to accommodate an appropriate temperature sensing means, such as a thermocouple 58 herein consisting of a single thermocouple wire helically wound about the tongue 59. The temperature sensing means 58 is connected to a sheathed lead 31 internally carried by the inner tube 50, hence through the smooth-walled lower concentric bore 48, the slanted bore 56 and the eccentric bore 42 of the inner member 34 to an independent millivolt reading, not shown. Lead 31 is fluid-tightly sealed, as at 53 and 55, in the eccentric bore 42 and in the slanted bore 56, respectively. The other lead 33 of the temperature sensing means 58 of the surgical probe 10 is conveniently anchored to the upper end of the inner member 34 by a screw 17. Both leads 31 and 33 are intended for connection to an independent millivolt reading, not shown, when the surgical probe is in use.

A temperature control member 60 completes the operative parts of the surgical probe 10. The temperature control member 60 is designed with an externally threaded portion 62 to fit within the internally threaded portion 36 of the inner member 34, a concentric smooth-walled portion 64 to be accommodated within the smooth-walled upper chamber 44 of the inner member 34, and is provided with a concentric conical valve 66 intended to seal off the upper end of the concentric bore 48 when the surgical probe 10 is not in operative use, as shown in FIG. 2. The smooth-walled portion 64 is, furthermore, provided with an annular groove 63 designed to carry an O-ring 65 therein. The O-ring 65 ensures fluid-tight mounting of the temperature control member 60 within the inner member 34 of the cylindrical housing 12. Rotation of the temperature control member 60 in a counter-clockwise direction within the inner member 34 effects translatory motion of the temperature control member 60 with reference to the inner member 34, moving thereby the conical valve 66 out of its sealed off position within and away from the upper end of the concentric bore 48. In order to facilitate the rotation of the temperature control member 60, the same is provided with a temperature control knob 24 having an L-shaped control arm 26 radially screwed therein, as at 25. To inhibit the unintended removal of either or both the temperature control member 60 and the inner member 34 from the outer member 32 of the housing 12, an L-shaped stop 28 is secured to the adjusting ring 22 by a screw 29. Stop 28 cooperates with a lug 30 welded to the upper outer periphery of the cylindrical housing 12 and prevents, when set screw 27 has been firmly secured thereto, the adjusting ring 22 from being turned more than one revolution. In like manner, safety stop 28 prevents, when the control arm 26 is in place, the temperature control knob 24 from being turned more than one revolution. Even when the control arm 26 is not screwed to the knob 24, the safety stop 28 inhibits the complete removal of the temperature control member 60 from within the inner member 34 of the housing 12.

The operative use of the surgical probe 10 shown in and described with reference to FIGS. 1 through 3 may be best explained with reference to FIG. 10 and is as follows. When surgical destruction of a selected small portion of the central nervous system, as in the human brain, is indicated as the required treatment for a particular patient, the surgical probe 10 is set up substantially as shown in the schematic representation depicted in FIG. 10. One end of the flexible pipe or hose 19 is securely attached to the connector fitting 18 of the cylindrical housing 12 while the other end 129 of the hose 19 is secured to a fitting 128. The fitting 128 has fluid connection through an intermediate suitable filter 130 and pressure gauge 132 to an appropriate refrigerant container 136 provided with a valve 134. The refrigerant container 136 may be a standard bottle secured on a stand, not shown, with the outlet valve 134 facing downward. If desired, a different bottle having a full-length dip tube may also be used. Such a bottle, however, unlike the bottle 136 shown in FIG. 10, must be used right side up, with its valve connection facing upward. Although any refrigerant can be used, the preferred refrigerant employed with the surgical probe 10 is monochlorodifluoromethane, commonly known as Refrigerant 22. In instances where such low temperatures as may be obtained with this refrigerant are not needed or desired, another refrigerant, dichlorodifluoromethane, commonly known as Refrigerant 12 may likewise be used.

One end of the other flexible pipe or hose 21 is also securely attached to the other connector fitting 20 of the cylindrical housing 12 while the other end 121 of the hose 21 is provided with a valved connection 23 either to the atmosphere or to a suitable vacuum system, not shown. Valve 23 can also be used to provide automatic temperature control for the surgical probe 10 by operating the valve 23 in conjunction with a solenoid or motor, not shown. The solenoid or motor can be driven by an appropriate sensing and controlling device, such as a meter-relay, also not shown, connected to leads 31 and 33, and actuated by a signal provided by the temperature sensing means 58. Whether the end 121 of hose 21 is connected to the atmosphere or to a vacuum system depends upon what temperature level is to be achieved at the cooling tip 16 of the surgical probe 10. With connection to the atmosphere, a temperature level as low as about thirty-five degrees centigrade below freezing (−35° C.) may be achieved at the cooling tip 16 of the surgical probe 10. This temperature level may be more than satisfactory for most of the exploratory surgery involved with respect to the central nervous system. In certain specific surgical invasions of the human body, however, still lower temperature may be required. In these latter instances, it is preferred to have the end 121 of hose 21 attached to a vacuum system being operated at an internal vacuum of at least about twenty inches of mercury, absolute. With connection to such a vacuum system, a temperature level as low as about sixty degrees centigrade below freezing (−60° C.) may be achieved at the cooling tip 16 of the surgical probe 10.

Thereafter, leads 31 and 33 are connected to an appropriate temperature measuring device, such as a millivolt reading, not shown having a range of at least three millivolts in order to provide the operating surgeon with a sufficiently accurate check on the temperature level at the cooling tip 16 of the probe 10. The cooling tip 16 of the surgical probe 10 is preferably coated with a plastic substance, such as dimethylpolysiloxane, by dipping the same into a liquid solution thereof and curing it. The application of such a coating to the cooling tip 16 of the probe 10 is recommended so as to prevent the adherence of human tissue to the tip 16 during the operative use of the instrument.

The bottle valve 134 is then opened, admitting thereby the liquid refrigerant stored in the bottle 136 under pressure through the hose 19 to the lower radial bore 13 of the housing 12. The bottle pressure should be checked by reading pressure gauge 132. With Refrigerant 22, it should register about 120 p.s.i.g. at room temperature of about 70° F. If the pressure is lower and it begins to drop as the refrigerant is discharged, it is an indication that the bottle is empty and should be exchanged for a fresh one immediately. Then, both the adjusting ring 22 and the temperature control knob 24 are turned counter-clockwise within the cylindrical housing 12. The adjusting ring 22 need only be rotated about 90° to about 180° in order to effect the desired degree of opening of the annular orifice 76; the temperature control knob 24, on the other hand, is to be turned as far as its control arm 26 permits. Simultaneously therewith, the valve 23 of the hose 21 is also opened. The liquid refrigerant entering the housing 12 of the surgical probe 10 through the lower radial bore 13 is admitted to the lower concentric cavity 37 of the outer member 32 from where it enters the outer tube 14, flowing about the inner tube 50 along the axial length thereof. Upon reaching the sleeve 70, the liquid refrigerant is forced to pas through the constricted passage formed by the annular orifice 76 and is then allowed to expand within the refrigerating chamber 78 of the cooling tip 16, effecting thereby the cooling of the tip 16. The expanded refrigerant is allowed to escape from the refrigerating chamber 78 through the inner tube 50, then traveling in the reverse direction along the axial length thereof it enters the smooth-walled lower concentric bore 48 of the inner member 34. Since the conical valve 66 has been opened by the turning of the knob 24, the refrigerant is allowed to enter the smooth-walled upper chamber 44, from where it passes through the number of radial passageways 46 into the upper concentric cavity 35 of the outer member 32, hence through the upper radial bore 15 enters the hose 21, thus leaving the probe 10.

When the cooling tip 16 of the surgical probe 10 has been cooled sufficiently, the probe 10 is ready for operative use by the surgeon. He then introduces the probe 10 into the patient, making sure that the cooling tip 16 comes to rest at the selected small area to be treated. Whenever possible, as in brain operations, the housing 12 of the probe 10 is made secure with respect to the patient by suitable supporting means. The surgeon then may conveniently select, with the aid of the millivolt reading, the temperature level of the cooling tip 16 of the probe 10 by turning with one finger the control arm 26, regulating thereby the position of the conical valve 66 within the concentric bore 48 of the inner member 34. By closing the conical valve 66, the temperature at the cooling tip 16 will rise; conversely, by further opening the conical valve 66, the temperature at the cooling tip 16 will fall. After the surgeon has subjected the selected small internal area to the desired localized freezing by the cooling tip 16, he may, if he so wishes, heat the tissue by the application of radio frequency waves. This may be conveniently done by attaching suitable connecting means, not shown, from a radio frequency source to the cylindrical housing 12 of the probe 10. When radio frequency waves are to be applied to the probe 10, it becomes necessary to provide the entire outer periphery of the tube 14 with a coating of methyl resin prior to the probe's use lest the tube 14 also acts as a source of radio frequency waves. In this manner, only the tip 16 of the probe 10 serves as such a source.

For some surgical invasions of the human body, it is preferred to modify the surgical probe 10 shown in FIGS. 1 and 2 as follows. While the overall longitudinal axial length of the probe 10 remains the same, the length of the cooling tip 16 is increased at the expense of the lengths of the tubes 14 and 50. By the use of such a modified probe, a correspondingly greater area may be subjected to treatment as, for instance, in local hypothermia of the prostate gland.

Figure 3A:
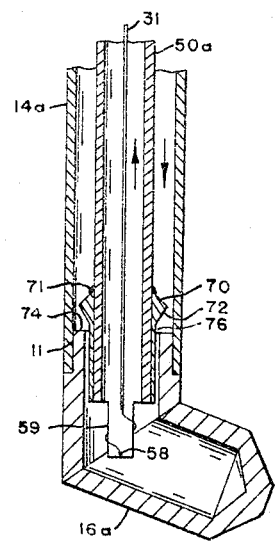
FIG. 3a is a view similar to FIG. 3, but showing an alternate arrangement in the construction of the cooled tip.
Figure 4:
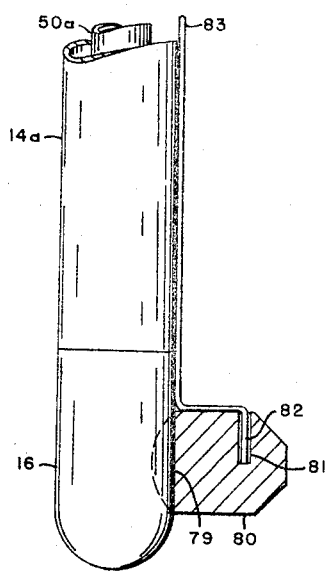
FIG. 4 is, on an enlarged scale, a fragmentary elevation of a portion of another preferred surgical probe in which the cooled tip is provided with a lateral prong.
Figure 5:
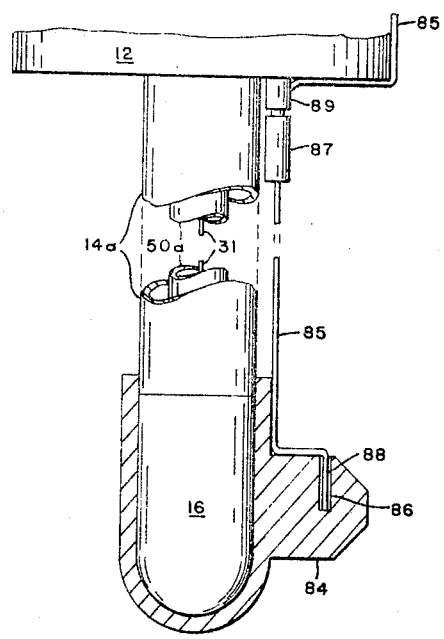
FIG. 5 is a view similar to FIG. 4, but showing another preferred surgical probe showing its cooled tip being enclosed by a slip-on, removable lateral prong.

The modifications in the surgical probe of the invention as depicted in FIGS. 3a, 4 and 5 are designed to adapt the instrument to uses in eye surgery. In most instances involving eye surgery, the surgeon prefers to hold the instrument by hand. To facilitate his handling of the probe, a convenient handle grip 75, as shown in FIG. 10, may be slipped over the connector fittings 18 and 20 and suitably secured to the housing 12. Also, to further facilitate the surgeon's handling of the probe, the longitudinal axial lengths of the tubes 14a and 50a have been considerably shortened to about one-third of the lengths of the tubes 14 and 50. In addition, it may be desirable either to change the construction of the tip 16 somewhat to that shown in FIG. 3a, as at 16a, or to provide the cooling tip 16 with a cooled lateral prong 80, welded or soldered to the tip 16 as at 79, as shown in FIG. 4. For best results, it is preferred to form the lateral prong 80 from a good heat-conductive material, such as copper or silver. It is furthermore desirable to provide the lateral prong 80 with its own independent temperature sensing means 82 secured within an appropriate bore 81. The temperature sensing means 82 may comprise a thermocouple or a thermistor provided with leads 83 which are then connected to an appropriate reading. The modification in the probe as shown in FIG. 5 allows the same instrument to be used for both types of surgery. In this arrangement, the cooling tip 16 is provided with a slip-on, easily removable lateral prong 84, likewise having its own independent temperature sensing means 88 imbedded in a suitable bore 86. The temperature sensing means 88 may likewise comprise a thermocouple or a thermistor provided with leads 85 removably attached by means of an appropriate coupling 87 to a suitable adapter 89 secured to the housing 12. Leads 85 are once again connected to an appropriate reading instrument, not shown.

Figure 6:
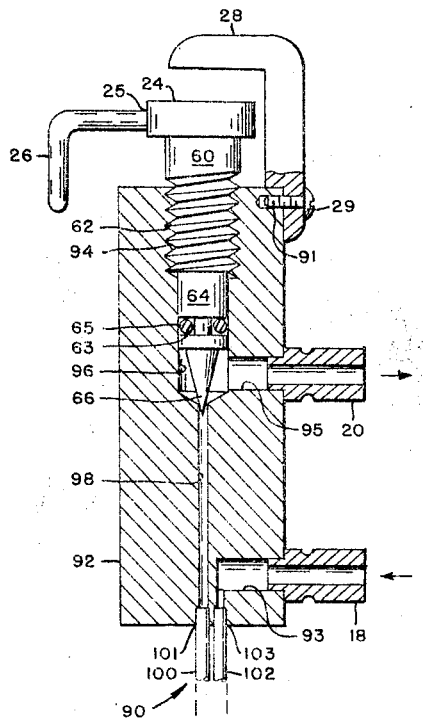
FIG. 6 is a longitudinal sectional elevation of still another preferred surgical probe constructed in accordance with and embodying the present invention.

FIG. 6 is a longitudinal sectional elevation of still another preferred surgical probe 90 constructed in accordance with and embodying the present invention. The surgical probe 90 comprises a cylindrical housing 92 provided along its longitudinal axis with a concentric internal passage consisting of three distinct but contiguous sections: an internally threaded portion 94, a smooth-walled upper chamber 96, and a smooth-walled lower concentric bore 98. Parallel with the lower concentric bore 98 extending into the housing 92 for only a short distance thereof is provided an off center spaced bore 103. The cylindrical housing 92 is, furthermore, formed with a pair of radial spaced openings 93 and 95 being in a plane normal to the longitudinal axis of the housing 92. The lower opening 93 connects with the off center spaced bore 103 while the upper opening 95 connects with the smooth-walled upper chamber 96. The spaced openings 93 and 95 are designed to accommodate the same connector fittings 18 and 20, respectively, as previously described with reference to the probe 10. One end of an elongated concentric tube 100 is securely mounted within the lower concentric bore 98, as at 101, while the other end of the tube 100 extends into and is mounted within a disc-like member 110, as will hereinbelow be more fully described with reference to FIG. 7. One end of a second elongated and eccentric tube 102 is mounted in the off center spaced bore 103 while the other end of the tube 102 is likewise secured to the disc-like member 110. Within the concentric internal passage of the housing 92 is operatively mounted the same temperature control member 60 as previously described with reference to the probe 10 and intended to accomplish the same function. As may be observed in FIG. 6, the externally threaded portion 62 of member 60 is designed to be accommodated within the internally threaded portion 94, the smooth-walled portion 64 is accommodated within the upper chamber 96, and the concentric conical valve 66 extends into the upper end of the concentric bore 98. The temperature control member 60 is likewise provided with a temperature control knob 24 having a control arm 26 screwed thereto, as at 25. An L-shaped safety stop 28 is also provided for the probe 90, but is stationarily secured by screw 29, cooperating with an internally threaded bore 91, to the cylindrical housing 92 itself.

Figure 7:
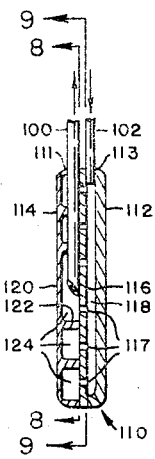
FIG. 7 is, on an enlarged scale, a fragmentary section of a part of the surgical probe shown in FIG. 6, showing the hollow disc-like member.
Figure 8:
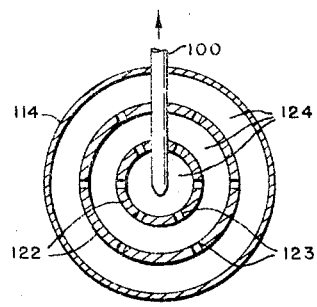
FIG. 8 is a section taken on line 8—8 of FIG. 7.
Figure 9:
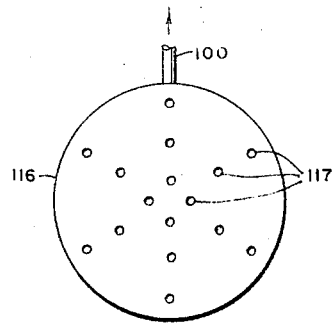
FIG. 9 is a section taken on line 9—9 of FIG. 7.

The disc-like member 110 shown in section and on an enlarged scale in FIG. 7 essentially comprises a warm portion 112 and a cooled portion 114 separated by a perforated dividing plate 116. The particular outer geometry of the member 110 may take other forms than that shown, depending entirely on the intended surgical use thereof. There are two parallel spaced holes 111 and 113 provided in the disc-like member 110 in a plane parallel with the longitudinal axis thereof, one on each side of and adjacent to the perforated dividing plate 116. In hole 113 is secured the other end of the eccentric tube 102, while in hole 111 is mounted the concentric tube 100 with its free and extending into and terminating near the center of the disc-like member 110. The eccentric tube 102 leads through hole 113 into a large, liquid refrigerant cavity 118 connected by a plurality of orifices 117 formed in the dividing plate 116 with a number of circular cooling chambers 124 formed by a series of circular walls 122 disposed between the perforated dividing plate 116 and the cooled, heat exchanger surface 120. As may be observed in FIG. 8, which is a section taken on line 8—8 of FIG. 7, the number of circular cooling chambers 124 are interconnected by a series of radial passages 123. FIG. 9 is a section taken on line 9—9 of FIG. 7 and shows the dividing plate 116 perforated by a plurality of orifices 117.

The operational setup for the surgical probe 90 shown in and described with reference to FIGS. 6 through 9 is the same as that already described with reference to the surgical probe 10. Although no temperature sensing means has been shown in the probe 90, it is to be understood that, if desired, the probe 90 may likewise be provided with a thermocouple 58 as disclosed in and described with reference to the probe 10. A liquid refrigerant admitted under pressure through connector fitting 18 enters the cylindrical housing 92 through lower radial opening 93 and passing through the off center spaced bore 103, it travels along the axial length of the eccentric tube 102 from where the refrigerant is discharged into the large, liquid refrigerant cavity 118 of the disc-like member 110. From this large cavity 118, the refrigerant is forced to pass through the plurality of small orifices 117 and is then allowed to expand within the circular cooling chambers, 124, cooling thereby the heat exchanger surface 120 of the disc-like member 110. As a result, a temperature differential has arisen between the two half portions 112 and 114 of the disc-like member 110, with portions 114 being considerably cooler than portion 112. From the circular cooling chambers 124, the refrigerant is allowed to escape through the concentric tube 100 and, traveling along its axial length, the refrigerant once again enters the housing 92, but this time through the lower concentric bore 98. If valve 66 of the temperature control member 60 is in the open position, the refrigerant is then allowed to leave the cylindrical housing 92 of the probe 90 by passing through the smooth-walled upper chamber 96 and upper radial opening 95 into the connector fitting 20.

The present invention thus provides a novel surgical probe for use in cyrosurgery as well as in related operating techniques where it is desired to cool selected small, internal areas of the human body.

Since certain changes may be made in the above described surgical probes without departing from the scope of the invention herein involved, it is intended that all matter contained in the above description or shown in the accompanying drawings shall be interpreted in an illustrative and not in a limiting sense.

What is claimed is:

1. A surgical probe comprising a housing having an internal passage along its longitudinal axis and a pair of openings normal to said axis and connecting with said passage, a first tube having one end secured in said passage and its other end capped by a tip, said tip forming an internal annular abutment at its junction with said first tube, a member mounted in said passage of said housing for motion in translation along its said axis, said member also having an internal passage concentric with said passage of said housing and connecting with one of said pair of openings, a second tube with one end secured in said passage of said member and having its free end extending into and in concentrically spaced relation from said first tube, a sleeve secured at its said free end of said second tube, said sleeve and said abutment forming an annular orifice, a temperature sensing means extending into said tip, and a temperature control means mounted in said passage of said member.

2. The surgical probe as defined in claim 1 in which said tip is provided with a lateral prong.

3. The surgical probe as defined in claim 1 in which said tip is enclosed by a slip-on removable lateral prong provided with its independent temperature sensing means.

4. A surgical probe comprising a cylindrical housing consisting of an outer member and an inner member operatively mounted within said outer member and having a pair of spaced radial bores in said outer member, both said outer member and said inner member having internal passages concentric with said cylindrical housing, said internal passages having connections with said pair of spaced radial bores, a first tube having one end mounted in said internal passage of said outer member and having its other end capped by a tip, said tip forming an internal annular abutment at its junction with said other end of said first tube, a second tube having one end mounted in said internal passage of said inner member and having its free end extending into and in concentrically spaced relation from said first tube, a sleeve secured at its said free end of said second tube, said sleeve and said internal annular abutment forming an annular orifice at its said junction of said tip and said other end of said first tube, a thermocouple mounted at said free end of said second tube and extending into said tip, and a temperature control member operatively mounted within said inner member and having a valve concentric with said internal passage of said inner member.

5. The surgical probe as defined in claim 4 in which said tip is provided with a lateral prong.

6. The surgical probe as defined in claim 4 in which said tip is enclosed by a slip-on removable lateral prong provided with its independent thermocouple.

7. A surgical probe comprising a cylindrical housing consisting of an outer member and an inner member and having a pair of spaced radial bores in a plane normal to its longitudinal axis in its said outer member, one of its said pair of spaced radial bores being adapted to have a supply of refrigerant under pressure associated therewith while the other of its said pair of spaced radial bores having a valved connection to the atmosphere, said cylindrical housing being also provided with an internal passage concentric with its said longitudinal axis and having connections with said pair of spaced radial bores, a first elongated tube one of whose ends is secured in said internal passage of said cylindrical housing and concentric with its said longitudinal axis while the other end of said tube is capped by a tip having an internal annular abutment, said inner member of said cylindrical housing being operatively mounted within said outer member for translatory motion along said longitudinal axis of said housing and being also provided with an internal passage concentric with its said longitudinal axis and having connections to one of said pair of spaced radial bores, a second elongated tube with one of its ends secured in said internal passage of said inner member and with the other end extending concentrically within said first elongated tube and having a sleeve attached at its said other end, said sleeve and said internal annular abutment of said tip forming an annular orifice, a temperature control member operatively mounted within said inner member of said cylindrical housing for translatory motion along its said longitudinal axis and having a conical valve concentric with said internal passage of said inner member, and a thermocouple secured to the free end of said second elongated tube.

8. The surgical probe as defined in claim 7 in which said tip is provided with a lateral prong having its independent thermocouple.

9. The surgical probe as defined in claim 7 in which said tip is enclosed by a slip-on removable lateral prong provided with its independent temperature sensing means.

10. The surgical probe as defined in claim 7 but in which the other of its said pair of spaced radial bores having a valved connection to a vacuum system.

11. A surgical probe comprising a housing having an internal passage along its longitudinal axis and a pair of openings normal to said axis and connecting with said passage, a first tube having one end secured in said passage and its other end capped by a tip, said tip being formed of two integral sections with one of said sections being coaxial with said longitudinal axis and the other of said sections being disposed at an angle to said longitudinal axis, said coaxial section of said tip forming an internal annular abutment at its junction with said first tube, a member mounted in said passage of said housing for motion in translation along its said axis, said member also having an internal passage concentric with said passage of said housing and connecting with one of said pair of openings, a second tube with one end secured in said passage of said member and having its free end extending into and in concentrically spaced relation from said first tube, a sleeve secured at its said free end of said second tube, said sleeve and said abutment forming an annular orifice, a temperature sensing means extending into said coaxial section of said tip, and a temperature control means mounted in said passage of said member.

References Cited by the Examiner

UNITED STATES PATENTS

| 1,902,016 | 3/1933 | Copeman | 128—400 |
| 2,190,383 | 2/1940 | Newman | 128—401 |

FOREIGN PATENTS

| 580,216 | 8/1924 | France. |

OTHER REFERENCES

Cooper: Journal of American Medical Association, Aug. 18, 1962 (pages 600–605 relied on).

RICHARD A. GAUDET, *Primary Examiner.*

G. McNEILL, *Assistant Examiner.*